(12) United States Patent
Cavaglia' et al.

(10) Patent No.: US 8,454,865 B2
(45) Date of Patent: *Jun. 4, 2013

(54) RADIAL MIXING DEVICES FOR ROTATING INCLINED REACTORS

(75) Inventors: Giuliano Cavaglia', Pessione (IT); Giuseppina Boveri, Patricia (IT)

(73) Assignee: Cobarr, S.p.A., Tortona (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,340

(22) Filed: Apr. 26, 2012

(65) Prior Publication Data

US 2012/0226012 A1 Sep. 6, 2012

Related U.S. Application Data

(63) Continuation of application No. 12/524,776, filed as application No. PCT/EP2008/051406 on Feb. 5, 2008.

(51) Int. Cl.
*B01J 2/00* (2006.01)
*B01J 19/18* (2006.01)

(52) U.S. Cl.
USPC .............................................. 264/8; 422/136

(58) Field of Classification Search
USPC .............................................. 422/136; 264/8
See application file for complete search history.

(56) References Cited

U.S. PATENT DOCUMENTS

| | | |
|---|---|---|
| 3,075,952 A | 1/1963 | Coover et al. |
| 3,174,830 A | 3/1965 | Watzl et al. |
| 3,220,804 A | 11/1965 | Bachman et al. |
| 3,443,909 A | 5/1969 | Goossens |
| 3,497,477 A | 2/1970 | Barkey et al. |
| 3,767,601 A | 10/1973 | Knox |
| 3,953,404 A | 4/1976 | Borman |
| 4,276,261 A | 6/1981 | Kerscher et al. |
| 4,370,302 A | 1/1983 | Suzuoka et al. |
| 4,639,217 A | 1/1987 | Adams |
| 4,644,049 A | 2/1987 | Tung et al. |
| 4,849,497 A | 7/1989 | Scannapieco |
| 4,876,326 A | 10/1989 | Rinehart |
| 5,033,230 A | 7/1991 | Kennepohl et al. |
| 5,245,093 A | 9/1993 | Ember |
| 5,362,844 A | 11/1994 | Kerpes et al. |
| 5,408,035 A | 4/1995 | Duh |
| 5,409,983 A | 4/1995 | Jones et al. |
| 5,449,701 A | 9/1995 | Duh |

(Continued)

FOREIGN PATENT DOCUMENTS

| CH | 260294 B2 | 3/1949 |
|---|---|---|
| DE | 3442058 B1 | 3/1986 |

(Continued)

OTHER PUBLICATIONS

Listvoyb, Gregory; Office Action Submitted in the Prosecution of U.S. Appl. No. 10/523,650; Aug. 31, 2007.

(Continued)

*Primary Examiner* — Jill Warden
*Assistant Examiner* — Huy-Tram Nguyen
(74) *Attorney, Agent, or Firm* — Edwin A. Sisson, Attorney at Law, LLC

(57) ABSTRACT

Disclosed in this specification is the design for an internal mixing device which increases the plug flow like behavior of the rotating inclined reactor.

6 Claims, 10 Drawing Sheets

U.S. PATENT DOCUMENTS

| | | | |
|---|---|---|---|
| 5,711,089 A | 1/1998 | Pikus | |
| 5,716,013 A | 2/1998 | Benson et al. | |
| 6,190,625 B1 | 2/2001 | Jha et al. | |
| 7,098,300 B1 | 8/2006 | Chen et al. | |
| 2005/0272906 A1* | 12/2005 | Cavaglia | 528/272 |
| 2006/0269887 A1* | 11/2006 | Von Blucher | 432/118 |

FOREIGN PATENT DOCUMENTS

| | | |
|---|---|---|
| EP | 0419440 A3 | 3/1991 |
| EP | 0953589 A2 | 11/1999 |
| EP | 1247563 B1 | 10/2002 |
| GB | 1190801 | 5/1970 |
| GB | 1317061 B1 | 5/1973 |
| WO | 9422764 B2 | 10/1994 |
| WO | 2004018541 B2 | 3/2004 |
| WO | 2007032930 A2 | 3/2007 |
| WO | 2007078876 A2 | 7/2007 |

OTHER PUBLICATIONS

Brairton, Scott A; Request for Reconsideration Submitted in the Prosecution of U.S. Appl. No. 10/523,650; Nov. 27, 2007.
Listvoyb, Gregory; Office Action Submitted in the Prosecution of U.S. Appl. No. 10/523,650; Feb. 20, 2008.
Fichter, Richard E.; Amendment and Remarks Submitted in the Prosecution of U.S. Appl. No. 10/523,650; Aug. 18, 2008.
Listvoyb, Gregory; Office Action Submitted in the Prosecution of U.S. Appl. No. 10/523,650; Nov. 17, 2008.
Fichter, Richard E.; Amendment and Remarks Submitted in the Prosecution of U.S. Appl. No. 10/523,650; May 18, 2009.
Listvoyb, Gregory; Final Office Action Submitted in the Prosecution of U.S. Appl. No. 10/523,650; Sep. 3, 2009.
Fichter, Richard E.; Amended Appeal Brief 37 CFR 41.37(d) Submitted in the Prosecution of U.S. Appl. No. 10/523,650; Apr. 2, 2010.
Listvoyb, Gregory; Examiner's Answer Submitted in the Prosecution of U.S. Appl. No. 10/523,650; Jul. 7, 2010.
Fichter, Richard E.; Reply Brief Submitted in the Prosecution of U.S. Appl. No. 10/523,650; Sep. 3, 2010.
Warren, Charles F.; Decision on Appeal in the Prosecution of U.S. Appl. No. 10/523,650; Jan. 31, 2012.

* cited by examiner

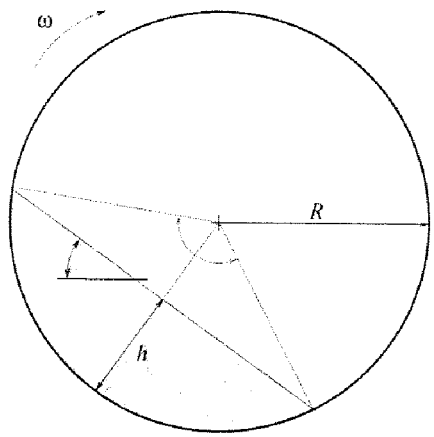
FIG.9
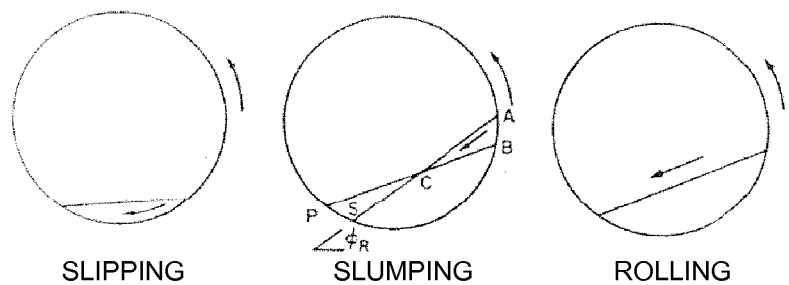
SLIPPING  SLUMPING  ROLLING
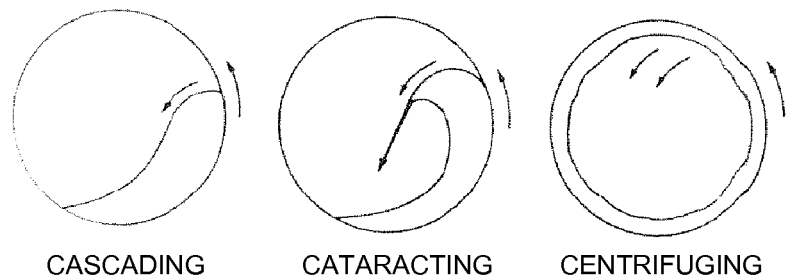
CASCADING  CATARACTING  CENTRIFUGING
FIG.10

RADIAL MIXING DEVICES FOR ROTATING INCLINED REACTORS

PRIORITY AND CROSS REFERENCES

This patent application is a continuation of U.S. patent application Ser. No. 12/524,776 filed 28 Jul. 2009 which is a 371 National Phase entry from, and claims the benefit of priority of PCT Application Serial No. PCT/EP2008/051406 filed 5 Feb. 2008.

BACKGROUND

The use of Rotary Kiln or cement kiln reactors for thermally treating plastic pellets, or chips, in particular granules, pellets or chips of crystallizable polyesters containing at least 75% of their acid units derived from terephthalic acid, orthophthalic acid, 2,6 naphthalate dicarboxylic acid or their respective diesters has been described previously in the patent application WO 2004/018541. An essential feature of WO 2004/018541 is the use of plug flow like behaviour to achieve uniformity of the properties of the granules at the exit. While WO 2004/018541 contemplates the use of baffles or internals it does nothing to teach the design of such baffles necessary to increase the mixing in the radial turning direction and yet maintain plug flow like behaviour.

U.S. Pat. No. 3,767,601 describes a rotary kiln reactor for polyester flake with internals for good mixing. U.S. Pat. No. 3,767,601 discloses kilns with internals for both batch and continuous processes. A batch process by definition cannot have plug flow, and nothing in U.S. Pat. No. 3,767,601 indicates that the internals are specially configured for mixing while maintaining plug flow like behaviour.

SUMMARY

This specification discloses a horizontal rotating reactor having an axis of rotation, wherein the axis of rotation is not parallel to the horizontal line perpendicular to the force of gravity and wherein the horizontal reactor has at least one mixing device wherein the mixing device has a height, width, and an equivalent length defined as the distance between the plane perpendicular to the axis of rotation that contains the point where the mixing device first protrudes from the wall and the plane perpendicular to the axis of rotation that contains the point where the mixing device stops protruding from the wall and the equivalent length of the mixing device is selected from the group consisting of equivalent lengths less than $1/10^{th}$ the length of the reactor. Further more preferred equivalent lengths of the mixing device are less than $1/12^{th}$ the length of the reactor, less than $1/14^{th}$ the length of the reactor, less than $1/15^{th}$ the length of the reactor, less than $1/16^{th}$ the length of the reactor, $1/18^{th}$ the length of the reactor and less than $1/20^{th}$ the length of the reactor. It is further disclosed that there is more than one mixing device.

It is also disclosed that at least one of the mixing devices has holes to introduce a purge gas into the reactor. It is disclosed that there be two or more mixing devices with holes. It is further disclosed that when there are two or more mixing devices with holes, that the mixing devices are connected in a manner so that the purge gas can pass to from the first mixing device to the second mixing device through a connection.

DESCRIPTION OF THE DRAWINGS

FIG. 9 shows the various elements of a rotary reactor, with the bed of material shown in darkened area.

FIG. 10 shows the different types of flow patterns the solid phase inside the reactor may experience as the speed of the reactor rotation increases.

DETAILED DESCRIPTION

Figure 1:
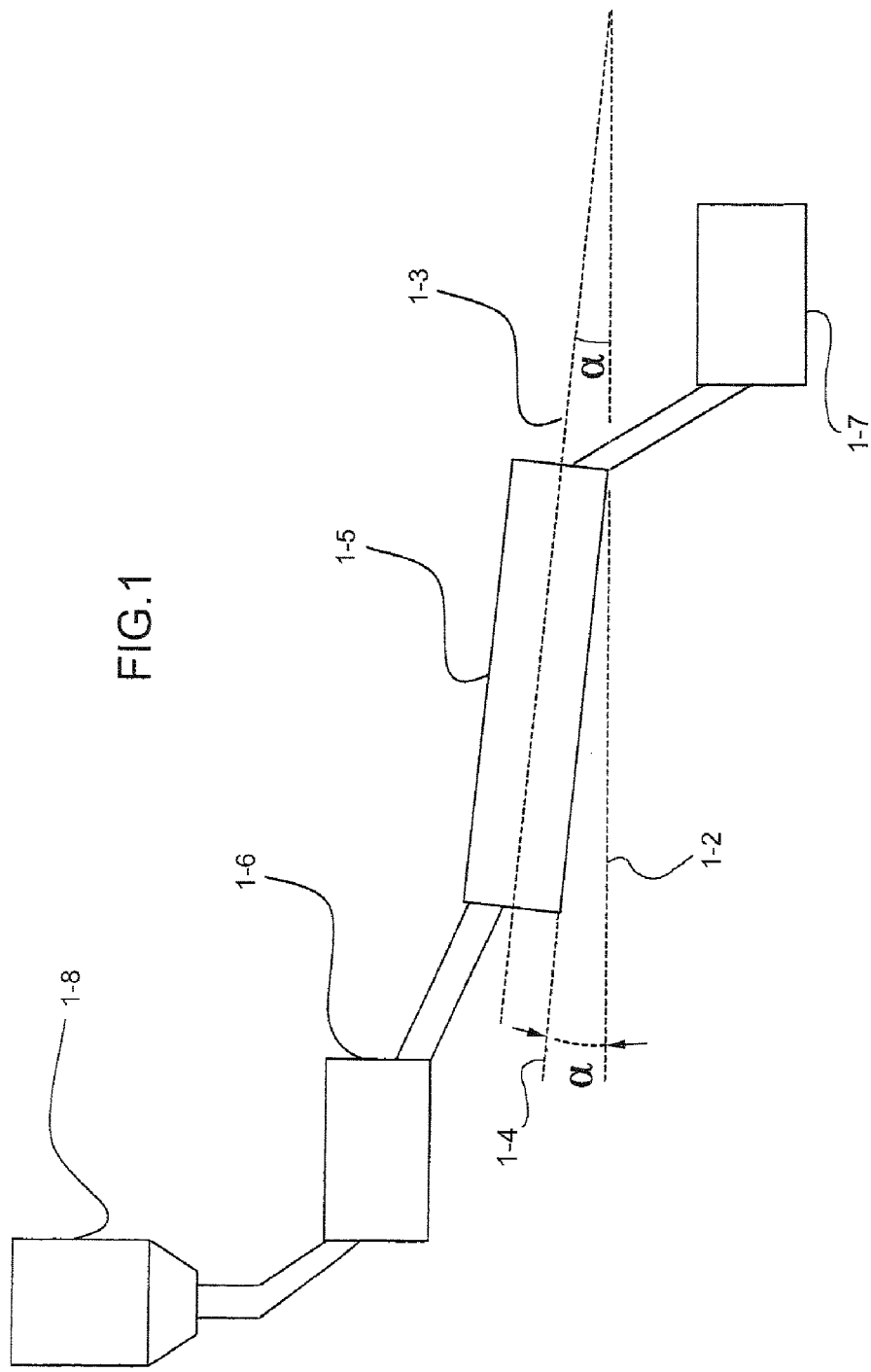
FIG. 1 is a side view of the rotary reactor relative to the horizontal axis and includes optional devices for the more commercial mode of operation.

Conventional wisdom is that rotational reactors with mixing devices (internals) have less plug flow behaviour or "degree of plug flow" than the same rotational reactor without mixing devices (internals). This is because it has been believed that the internals would create both axial and radial mixing components. The practitioner knows that axial mixing component—causing the material to fall forward or backward along the axis of rotation creates wide distributions of properties and is the primary effect of any internals. This means that the degree of plug flow of a reactor with internals should always be less than that of the same reactor without internals.

Described and claimed herein is that discovery that when the equivalent length of the internal mixing device is greater than about $1/10^{th}$ the length of the horizontal reactor, the axial mixing component is greater than the reactor without a mixing device, but when the equivalent length of the mixing device is less than about $1/10^{th}$, in particular less than $1/20^{th}$, the length of the horizontal reactor, the degree of plug flow, as defined herein, increases, rather than decreases, as evidenced by the increased radial flow component, without a corresponding increase in axial flow component.

Therefore, described in this specification is the design of the internals of a rotating reactor which allow for good radial mixing, yet maintaining the plug flow like characteristic of the rotating reactor. The internal is referred to as a mixing device, or mixing devices if more than one is present. The mixing device is also known as a baffle or lifter. This internal is particularly useful in rotating reactors used to increase the intrinsic viscosity of polyester resins.

In order to understand this description it is necessary to understand the differences between plug flow and CSTR reactors, both from a theoretical basis and the real world applications where true plug flow and CSTR reactors do not exist.

First, all chemical reactors are characterized by a certain degree of mixing. One of the two extreme cases, or end points, is the Continuous Stirred Tank Reactor (CSTR), which is the perfectly mixed system. A CSTR reactor is a reactor where 100% of the matter that constitutes the reactor hold-up has the same composition of the outlet stream. This is due to the fact that the equipment theoretically performs as an ideal completely mixed reactor.

On the other end of the reactor spectrum is the Plug Flow reactor, which is the perfectly segregated reactor, namely a reactor whose hold-up can be divided into an infinite number of hold-up slices with the specific composition each one different form the next one. The matter inside the reactor proceeds like a "plug" or like a "piston"

The practitioner knows that in reality, neither perfect CSTR nor perfect plug flow reactors exist and that the term "degree of plug flow" is used to characterize equipment and reactors with respect to fluid dynamics of involved gas, liquid and solid phases.

The degree of plug flow is expressed in the n-CSTR in series model, where n is the number of CSTR's which constitute the cascade or series of n-CSTR having the same distribution of the residence times as the reactor.

If n=1, then the reactor is the ideal perfect CSTR. If n=∞, then the reactor is the ideal perfect Plug flow reactor.

Vertical moving bed solid state polymerization (SSP) reactors (like the ones currently used in present commercial solid state polymerization technologies), generally speaking, have a degree of plug flow equivalent to a range of 4 to 8 CSTRs in series, and in any case lower than 10 CSTRs in series.

It is known from literature that the highest degree of plug flow achievable on the solid phase inside a kiln type reactor is associated with "ROLLING" and "SLUMPING" flow regimes. FIG. 10 shows the type of flow regimes of the solid phase and the movement of the material described with the literature with slipping being associated with the slower reactor rotational speed and centrifugation associated with the higher speeds.

The following degrees of plug flow were established using polyester chips in the rotational reactors C1, C2 and C3, of the following dimensions:

C1=2 meter long, 175 mm diameter (D) (without mixing devices): n=100 to 150
C2=22 m long and 2.1 m diameter (D) (without mixing devices): n=300 to 400
C3=(L>50 m; L/D=10 to 12 (without mixing devices): n<500

As is evident from the experimental data, a horizontal rotational SSP reactor without mixing devices is far more close to ideal plug flow than current commercially available conventional vertical cylindrical moving bed SSP reactors.

Not all the reactor applications for chemical or polymerization reactions require a plug flow behavior for the phases involved. However, it is necessary whenever the reaction kinetics is greater than the first order, since the high degree of segregation of the plug flow reactor, impeding the flattening of the reactants concentrations on the values of the same at the exit from the reactor, enhances the advancing of the reaction; furthermore, the plug flow behavior is necessary when a narrow distribution of the properties of the finished product is requested.

The rotary reactor contemplated for these internal mixing devices is a reactor which is part of a larger process used to continuously solid phase polymerize polyesters as described in WO 2004/018541, the teachings of which are incorporated in their entirety. This process is shown in various Figures accompanying this written description.

Polyester prepolymer granules stored in hopper 1-8, or other such storage device, are fed to a heater-crystallizer 1-6, where they are heated to a suitable temperature to cause the crystallization of the granules, pellets, or chips with minimal sticking Preferably there should be no sticking. This crystallizer could be one of many in the art, however, the rapid crystallization at high temperatures is preferred over slow crystallization and low temperatures.

Preferably, the crystallization step is carried out in a fluidised bed crystalliser 1-6 by utilizing a gas flow rate sufficient to cause the polyester granules to be fluidized with or without mechanical vibration. To this purpose inert gas or air can be used. Crystallization can generally be accomplished at residence times in the range of about 2 to about 20 minutes and, preferably, from about 10 to about 15 minutes. In the case of polyethylene terephthalate resin, heating is achieved by us of a fluidizing medium (either air or inert gas) at temperatures in the range of about 140° C. to about 235° C. and preferably in the range of about 200° C. to about 225° C. The Residence time to crystallize the polyester granules to the desired level depends on the crystallization temperature and crystallization rate of the polymer; low crystallization temperature requires longer crystallization time.

In general, polyethylene terephthalate prepolymer is crystallized to a crystallization degree corresponding to a density of at least about 1.37 g/cm$^3$. The polyester granules can also be crystallized by vapor treatment (see for example U.S. Pat. No. 4,644,049) or by high frequency energy field ranging from about 20 to about 300 MHz (see for example U.S. Pat. No. 4,254,253). After being crystallized, granules may optionally be fed into a preheater using purge inert gas. The crystallized polyester granules can optionally be dried after exiting the crystallizer. However, drying it is not strictly necessary and it is less costly to polymerize "wet" polyester, as it is known from U.S. Pat. No. 3,718,621.

After crystallisation the polyester granules are solid-phase polymerised. The crystallization and solid phase polymerization steps do not have to be conducted in strict temporal sequence, namely they have not to be necessarily conducted one right after the other. One may crystallize at one location and ship the crystallized materials to another location to be solid phase polymerized.

The solid phase polymerization step is carried out in at least one horizontal inclined (preferably cylindrical) reactor shown as 1-5 in FIG. 1. The reactor rotates around a central axis, 1-3, known as the axis of rotation. This is similar to a "rotary kiln". The solid phase polymerization reactor will be hereinafter for simplicity abbreviated as "HCIRR" and is referenced in FIG. 1 as 1-5.

An additional feature of the HCIRR reactor is the angle of inclination (α, in FIG. 1) which is the angle formed from the intersection of the horizontal and the axis of rotation. As shown in FIG. 1 it is also the angle formed by a line 1-4 parallel to the axis of rotation 1-2. Preferred values for the angle of inclination are between 0.1° and 12°, more preferably between 1° and 6°, with a preferred maximum polyester granule bed height of 4-5 meters. Advantageously, the combination of the inclination and the rotation, preferably with a speed between 0.1 and 10 rpm of the HCIRR reactor (FIG. 1-5) and proper flow from one end to the other of the HCIRR reactor (FIG. 1-5), is provided and constant renewal of the inter-granular contact areas occurs so that polyester granules do not have a chance to creep into one another. As the weight itself of the granules mass inside the reactor can not be ignored with respect to other forces acting as, for example the force of inertia, preferably the design and operating parameters of the reactor HCIRR 1-5 will be chosen so that the granules flow regime inside the reactor is characterized by a Froude Number $Fr=(\omega^2 \times R/g)$ comprised in the range of $1\times10^{-4}$ to 0.5; where $\omega$ is the angular velocity of the reactor; R is the internal radius of the reactor and g is the gravity acceleration=9.806 m/s$^2$.

This flow regime, named "rolling", is such that, when granules are submersed in the bed of solid, they behave as a rigid body and rotate at the same rotational speed of the HCIRR reactor, and, when they come at the surface of the solid bed, they slide on the surface itself. This solid flow regime facilitates having a true "plug flow like" behaviour of granules or pellets. Because absolute true plug flow is only a theoretical construct, the phrase plug flow like behaviour is used, with the reactor exhibiting more or less plug flow like behaviour which means the reactor has more or less degrees of plug flow behaviour as described previously.

The crystallized (or crystallized and preheated) polyester granules are passed into the top of the HCIRR reactor (FIG. 1-5) (or in the first HCIRR reactor of a series of HCIRR reactors, when the plant has more than one HCIRR reactor in series) and pass through the HCIRR reactor (or the reactors) due the force of gravity brought on by the reactor's inclination as well as the reactor's rotation.

The granule flow rate through the HCIRR reactor 1-5 is controlled by regulating discharge from the HCIRR reactor itself. Such discharge is then fed into a cooling device 1-7.

Polymerization is conducted in a stream of purge inert gas. Purge flow well below the turbulent rate is generally preferred so to prevent fluidization and entrainment of polyester granules. Furthermore, when more HCIRR reactors are present in series the inert gas flow rate will normally be approximately equal. In the latter case, it is preferred that the rate in each HCIRR reactor not exceed 1.25 times the rate in any other reactor in a reactor series. Preferably, furthermore, both in the case of a single HCIRR reactor or a HCIRR reactor series the purge gas passes through the HCIRR reactor 1-5 counter-current to flow direction of the polyester granules. Although also a purge gas flow co-current with the direction of the flow of the granules can be used, this latter configuration proves to be less efficient and generally requires a higher gas flow rate.

Suitable purge gases for use in the process of this invention preferably include nitrogen, but also carbon dioxide, helium, argon, neon, krypton, xenon, air and certain industrial waste gases and combinations or mixtures thereof can be chosen.

Moreover, optionally, purge inert gas can be recycled to the reactor, after having been purified of organic impurities, preferably until reaching a level of organic impurities less than or equal to 100 p.p.m. by weight ($CH_4$ equivalent).

In general the polymerization temperature will be included in the range from just above the threshold polymerisation temperature to a temperature within a few (3) degrees Centigrade of the polymer sticking temperature (which may be well below the melting point of the polymer). Usually this threshold temperature is 40° C. above the onset of the crystallization temperature of the polymer.

For example, when polymerizing PET homopolymers and copolymers with up to 5% modification on a mole basis, a temperature in the HCIRR reactor within the range of about 170° C. to about 235° C. and preferably in the range of about 190° C. to about 225° C. is suitable. Temperatures in the range of about 205° C. to about 220° C. are preferred. These are also the suitable temperatures for the first HCIRR reactor in a series if there is more than one HCIRR reactor.

Modified PET copolymers containing from about 1 to about 3 mole percent isophthalic acid, a percentage based on total acids, are polymerized at about 5 to 8° C. lower temperatures because their melt points are lower the PET homopolymers. Such copolyesters are less crystalline and have a great tendency to stick at polymerization temperatures.

A central feature of the HCIRR reactor is that it revolves around an axis of rotation (FIG. 1-3), wherein the axis is not parallel with the horizontal, which is a line perpendicular to the gravitational pull. The axis of rotation is not parallel with the horizontal perpendicular to gravitational pull when a material such as water or pellets are placed in a the higher end of the rotating reactor and when unaided by forces other than gravity and the rotating reactor, move to the other, lower end. The rotational axis is parallel to the horizontal line perpendicular to gravitational pull when water, pellets, or another substance placed in an end of the reactor and subjected to no force other than gravity, (including friction forces), will not move to the other end. Obviously, this experiment is to be tried at both ends of the reactor, because if the axis of the reactor is not parallel to the horizontal plane the material will move on one end but not move down the reactor on the other end. The angle formed by the intersection of the axis of rotation and the horizontal line perpendicular to gravitational pull is called the angle of inclination, ($\alpha$).

While it is known in the art to attach mixing devices, such as baffles or lifters, to the wall of the rotational reactor, however, the design for plug flow like behaviour has not previously been disclosed. Disclosed in this specification are mixing devices which mix the material by removing the material at the wall and replacing it with material towards the center of the bed of flow, but doing so in a manner that maintains or improves the plug flow like behaviour of the reactor.

It was directly observed during the experiments of rotational devices without mixing devices and rotational reactors with mixing devices of various lengths, that the granules/chips moved as a rigid body when they are submerged and slide down (or "roll down") from the upper side to the lower side of the chord that represents the upper boundary of the solid phase when the chips/granules were processed in a rotational inclined reactor without a mixing device. The chord is the chord of the circle described by the cross sectional of the reactor wall wherein the chord is top of the granule bed as the granules are pulled up the wall of the rotating vessel. This chord is depicted in FIG. 9. While rolling down the chord, each chip is disturbed by the roughness of the bed surface (made up of other chips). The effect of this disturbance is that some chips were sent backward along the axis of rotation (up the reactor) and some forward in the direction of reactor axis (down the reactor) thus generating a measurable and observable degree of axial dispersion. When the equivalent length of the mixing devices was greater than $\frac{1}{10}^{th}$ the length of the reactor, there was more axial mixing than without the mixing devices. Even if these reactors with mixing devices perform in a very high plug flow degree, they do not provide as high a degree of plug flow as the reactor without the internal mixing devices.

Figure 2:
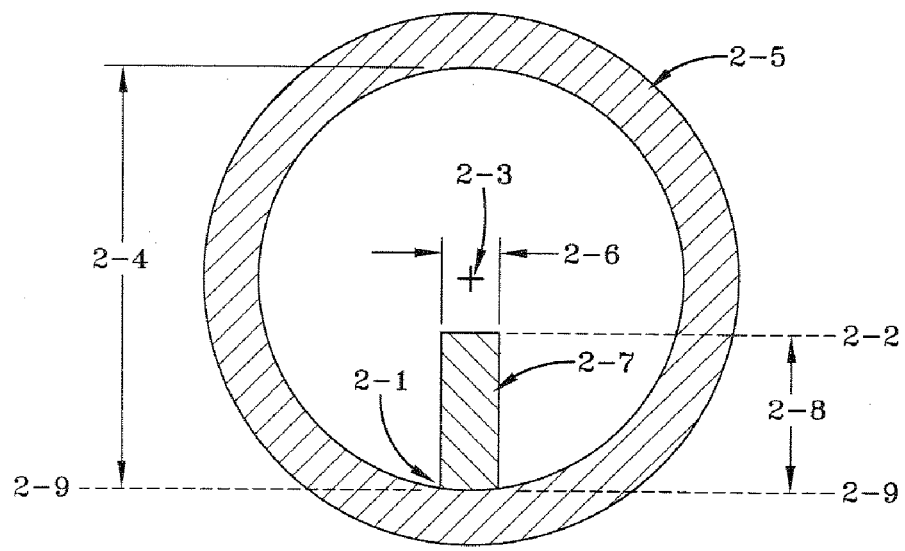
FIG. 2 is the view of a plane perpendicular to the axis of rotation and includes one mixing device, also known as a baffle or lifter.

In one embodiment of the mixing device, at least one mixing device is attached to the wall of the reactor. FIG. 2 is cutaway view of the reactor in a plane perpendicular to the axis of rotation and containing one mixing device. The thickness of the mixing device is depicted as 2-6. The reactor wall is depicted as 2-5 and the inner diameter thereof as 2-4. The mixing device protrudes from the wall at point 2-1, which is the intersection of the line 2-9 which is the line tangent to the circle circumscribed by the rotation of reactor wall at a point the furthest distance from the axis of rotation 2-3. The height of the mixing device in the plane view is the distance 2-8 which is measured from the point of protrusion 2-1 to the top of the mixing device in the plane 2-2.

The thickness 2-6 of the mixing device in the plane perpendicular to the axis of rotation is not essential to maintaining plug flow. However, the practitioner will recognize that it must be strong enough to not deform or break under the stress due to the resistance of the solid phase when rotating through the material it is trying to mix. Therefore, the thickness of the mixing device is determined by the required strength which is determined in part by the material of construction and the temperature of operation.

The height of the mixing device in the plane perpendicular to the axis of rotation is the distance from wall of the reactor to the top of the mixing device. Although not essential to maintaining plug flow like behaviour, it has been found that the best results are obtained when the height is less than half the diameter of the circle defined by the rotation of the point where the mixing device joins the wall of the reactor about the axis of rotation. (FIG. 2-3) For a circular reactor, the height of the mixing device would be less than one half the inside diameter, or the radius, of reactor. It is not necessary or required that the height of the mixing device be constant along the length of the mixing device. However, when height of the mixing device, also known as its radial penetration (protrusion) is less than $1/20$th reactor diameter the beneficial effect either on gas-chips renewal rate or on plug flow like behaviour becomes negligible, even if length of mixing device is less $1/20^{th}$ total reactor length. At this height, such type of internals serve only as anti-slipping device, to avoid slipping of chips on the reactor wall.

There are two lengths of the mixing device. The physical length of the mixing device is the length of the device measured from top of the device at the point where the mixing device first protrudes from the wall to the top of the device where the mixing device ends, or stops protruding from the wall. The point of protrusion at the beginning or end of the mixing device is when the height of the mixing device is less than about $1/20^{th}$ the diameter of the circumference of a circular reactor. The mixing device stops protruding from the wall when the height is less than about $1/20^{th}$ the diameter of the circumference described by the rotation of the point of protrusion. The equivalent length of the mixing device is the distance between the plane perpendicular to the axis of rotation that contains the point where the mixing device first protrudes from the wall and the plane perpendicular to the axis of rotation that contains the point where the mixing device stops protruding from the wall. This is depicted in FIG. 3.

Figure 3:
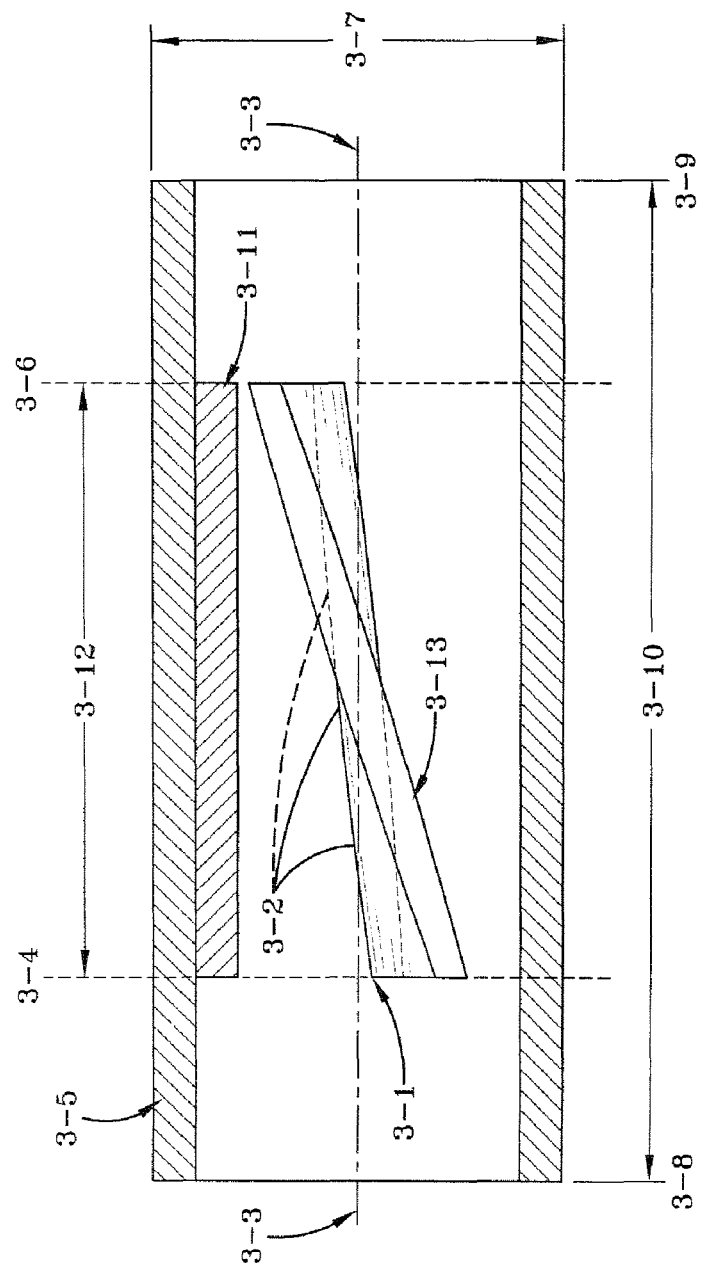
FIG. 3 is a side view of a rotary reactor and shows the theoretical length of the mixing device as measured relative to the axis of rotation. Also shown is the length of the rotary reactor.

FIG. 3, shows the reactor length of length 3-10 and the equivalent length of two mixing devices, 3-11 and 3-13. Mixing device 3-13 is a spiral that traces the rotational curve of the reactor. The equivalent length of device 3-13 is depicted as 3-12. which is the distance along the axis of rotation of the point of first protrusion 3-1, which corresponds to 3-4 and the last protrusion, which corresponds to 3-6. The physical length of this mixing device is greater than the equivalent length because the device traces the curve or spiral of the reactor. This is line 3-2. The second mixing device, 3-11, runs parallel to the axis of rotation. Therefore its physical length and equivalent length are the same. The length of the reactor is not to scale, but is 3-10, which is the distance between point 3-8 and 3-9. Other referent points on FIG. 3 are 3-5, the reactor wall, 3-3, the axis of rotation and 3-7, the diameter of the reactor.

Figure 4:
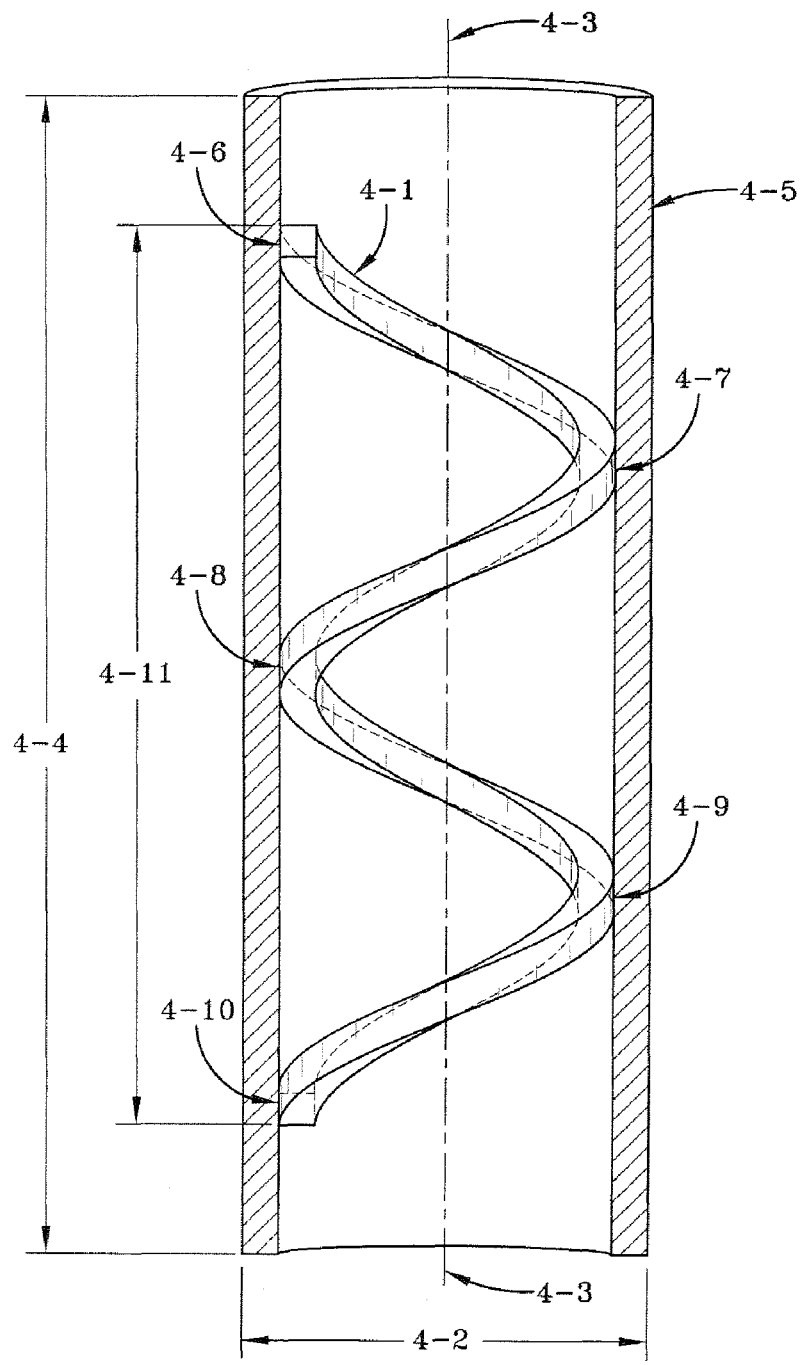
FIG. 4 is a side view of the reactor having a spiral mixing device with the actual length of the mixing device being the distance measured along the mixing device as it spirals around the vessel.

This distinction between physical length and equivalent length is used to describe a mixing device which protrudes from the wall, yet spirals along the reactor wall. The physical length could be three or four circumferences, yet still only have an equivalent length of 0.5 circumferences. This is depicted in FIG. 4, where the mixing device, 4-1 circles the reactor wall, 4-5, 2 times. This reactor has a diameter of 4-2 and a length of 4-4. The equivalent length 4-11 is from the point 4-6 to 4-10, as measured along the axis of rotation 4-3, while the physical length is the measurement along the wall tracing the device from 4-6 to 4-7 to 4-8 to 4-9 to 4-10. For a circular reactor and a perfect spiral, the physical length can be determined from Pythagorean's theorem treating the circumference of the reactor as the base of the triangle, the equivalent length as the height and the physical length as the hypotenuse of the right triangle.

While the spiral configuration is possible, it is not believed that a mixing device which completely circles the reactor at least once provides the desired mixing. However, such a mixing device is contemplated. It is believed that better mixing is achieved when the mixing device does not form a complete circle.

Forming a complete circle can be described as when the physical length of the mixing device is greater than the following formula, (Formula 1)

$$\sqrt{(a^2+b^2)}$$

Where a is the equivalent length of the mixing device and b is the circumference of rotation which is the distance traveled in one rotation of the point of protrusion from the wall. It is also the inner circumference of a round annular reactor. It is believed preferred therefore that the physical length be kept less than the value defined by Formula 1.

It is this equivalent length that determines whether plug flow like behaviour is affected. What has been discovered is that when the equivalent length is less than about one-twentieth the length of the reactor, plug flow is enhanced. While equivalent lengths of less than $1/20^{th}$ the length of the reactor are beneficial, it is also believed that other lengths will work as well, therefore it can be said that the equivalent length be selected from the group consisting of equivalent lengths less than $1/10^{th}$ the length of the reactor, less than $1/12^{th}$ the length of the reactor, less than $1/14^{th}$ the length of the reactor, less than $1/15^{th}$ the length of the reactor, less than $1/16^{th}$ the length of the reactor, $1/18^{th}$ the length of the reactor and less than $1/20^{th}$ the length of the reactor.

The practitioner will recognize that there could be multiple mixing devices in any given horizontal section of the reactor. For example, there could be a first mixing device protruding from the wall at a first point in the circumference of rotation and second mixing device protruding from the wall at a second point 180° from the first point in the circumference of rotation. Other mixing devices could protrude from the wall at points 90° and 270° from the first point. While the previous examples try to balance the mixing devices, the number of mixing devices and their location relative to the first mixing device is not essential. This configuration is depicted in FIG. 5.

Figure 5:
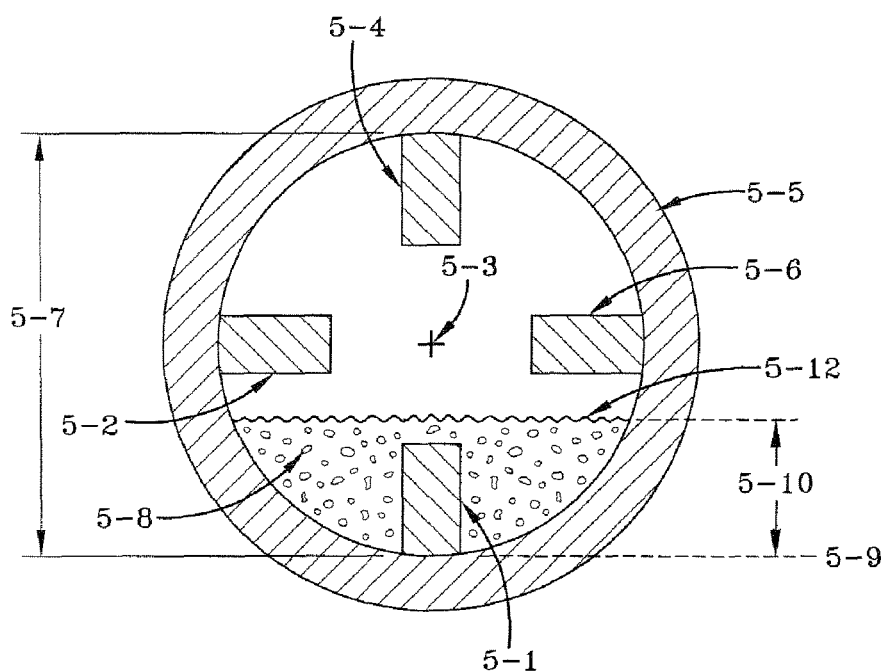
FIG. 5 depicts one embodiment with several baffles in a plane perpendicular to the axis of rotation. It also shows the sample bed height.

FIG. 5 shows the reactor wall of 5-5, the axis of rotation 5-3, and four mixing devices (5-1, 5-2, 5-4, 5-6), each 90° apart from each other. Also shown is the bed of material, 5-8, when the reactor is not rotating. The bed height is depicted as 5-10 and is the distance from the top of the bed 5-12 to the wall of the reactor at the thickest point of the bed. 5-9 is the tangent line intersecting the point of protrusion and 5-7 is the inside diameter of the reactor.

If using multiple mixing devices, it is also not essential that the mixing devices start to protrude and cease to protrude in the same plane perpendicular to the axis of rotation. They could be staggered along the length of the reactor.

It is also contemplated that the mixing device be curved from the top of the mixing device to point of protrusion from the wall. This curve is also relative to the plane intersecting axis of rotation and the point of protrusion from the wall. The curve could arc into the direction of rotation or away from the direction of rotation.

Figure 6:
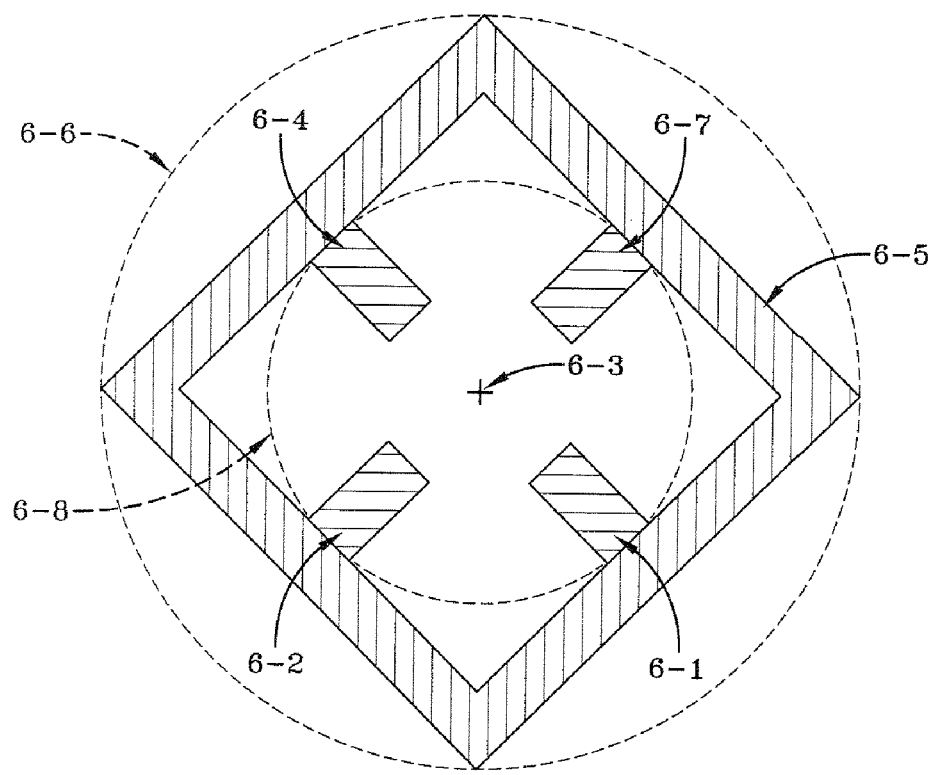
FIG. 6 depicts the embodiment where the vessel is not round, but its outer wall rotates.

FIG. 6 shows an embodiment that could include the teachings of this art. In this embodiment, the actual reactor vessel (6-5) is not round, but in this example, square. Even though the reactor 6-5 is square, its rotation about the axis of rotation 6-3 will describe a circle 6-6 at its external corners and a further circle 6-8 at its points of protrusion for each baffle 6-1, 6-2, 6-4, and 6-7. It is this latter circle which would be used to calculate the various dimensions for each mixing device.

Figure 7A:
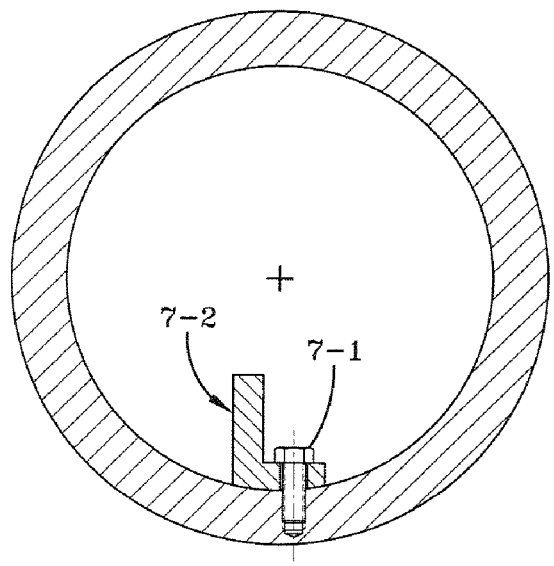
FIGS. 7a and 7b depict respective different ways to attach the mixing device to the wall of the reactor.
Figure 7B:
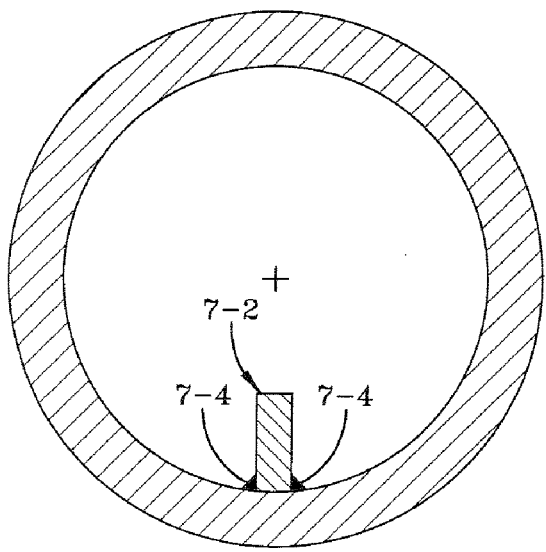

The mixing device can be attached to the wall in any manner. FIGS. 7*a* and 7*b* show a bolted and welded mixing device. In the FIG. 7*a*, mixing device 7-2 is attached used in the bolt 7-1. In the FIG. 7*b*, the mixing device 7-2 is welded to the wall and 7-4 shows a bead from a weld.

The mixing device should also be devoid of holes transversing the axis of rotation which are larger than the size of the granules, pellets, flakes or chips to be processed. In one embodiment holes are specifically contemplated. Since the reactor of performs better when a gas is, partially or totally, injected into the chips bed, the mixing device can be hollow with holes that allow the purge gas to be introduced into the material by first passing it into the mixing device and letting it pass through the holes into the bed of the material being processed. Multiple mixing devices can be connected by a pipe or functional equivalent structure.

Figure 8A:
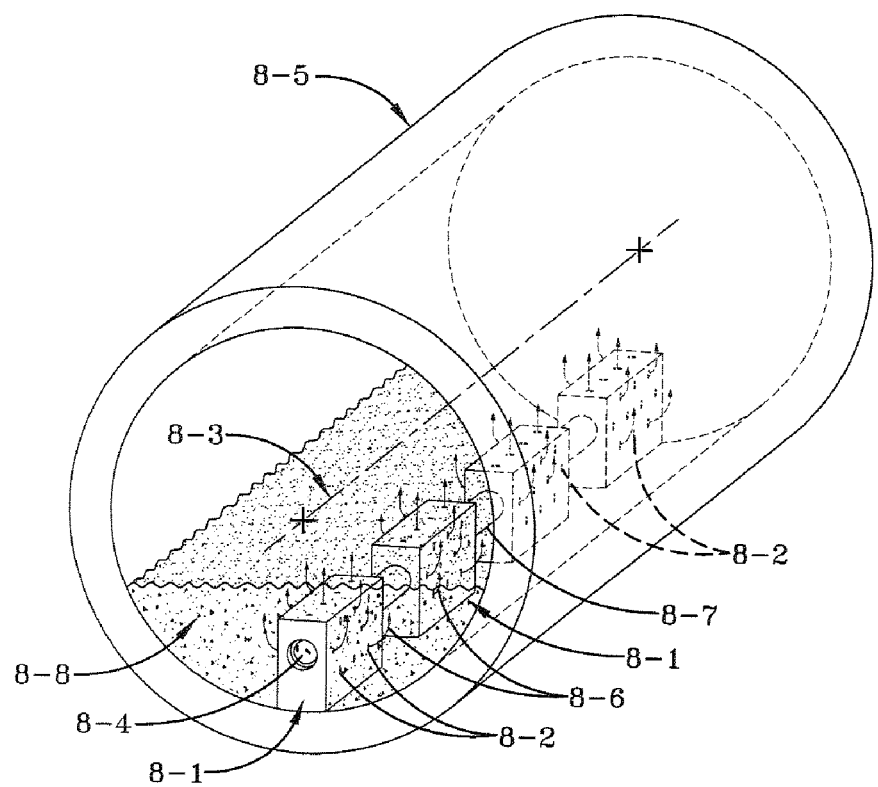
FIGS. 8a and 8b show the mixing device with holes to allow the purge gas to be introduced into the bed of granules or pellets.
Figure 8B:
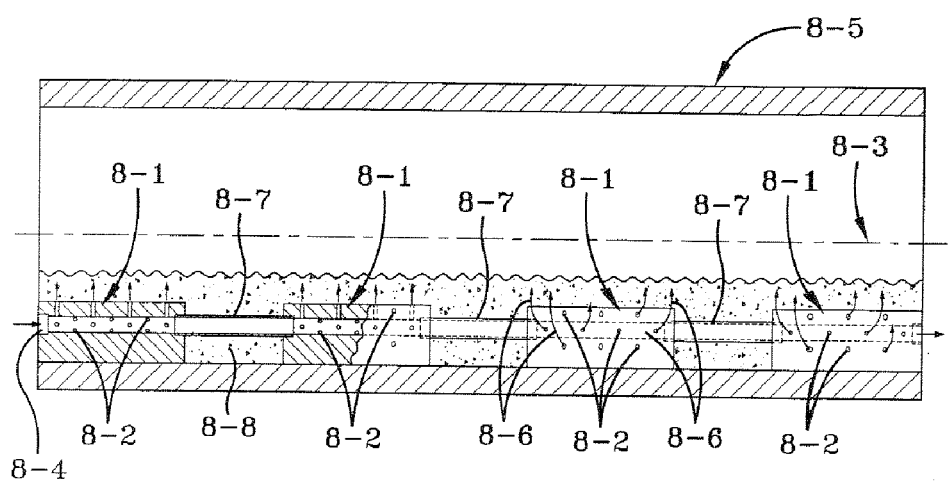

FIGS. 8*a* and 8*b* show an embodiment of this mixing device. In detail, the reactor 8-5, with axis of rotation 8-3, has a series of mixing devices 8-1. These mixing devices are hollow with a large hole, 8-4. Holes 8-4 are for the introduction of the purge gas into the mixing devices, while holes 8-2, which are smaller than the pellets or chips being processed, are used to distribute the purge gas, 8-6, throughout the bed 8-8. The mixing devices 8-1 are linked in series by connectors denoted as 8-7. Although believed to be not essential, it is believed that better efficiency is achieved when the connectors are not in contact with the wall of the reactor. In practice, not in contact means at least 10 mm from the reactor wall.

Different configurations are possible. For example, one can divide an 80 meter reactor into 3 zones: 30 meters, 20 meters, 30 meters, and place two mixing devices in each 2 meter section of each zone. The mixing devices are preferably 180° radially apart from each other. The difference between the zones is that the height of the mixing device is varied, also as a function of the different height of the head of the solid phase along the axial coordinate of the HCIRR reactor.

In another embodiment, there would be one mixing device per section. In another embodiment the reactor is divided into 80 meter sections, with the first section having one mixing device, the next section having the second mixing device with the start of the second mixing device located 90° from the end of the first mixing device, the start of the third mixing device in the third section located 90° from the end of the second mixing device and 180° from the end of the first mixing device. Such a configuration would continue through the zones. All of these configurations have been trialed with better plug flow like behaviour than having no internals and certainly better than the when the internal mixing device was greater than $1/10^{th}$ the length of the reactor.

Experimental Results

The first set of experiments were conducted in a glass tube rotating circular reactor having an internal diameter of 175 mm, a length of 1800 mm, total volume of 43 cubic decimeters and a 1° angle of inclination.

Figure 11A:
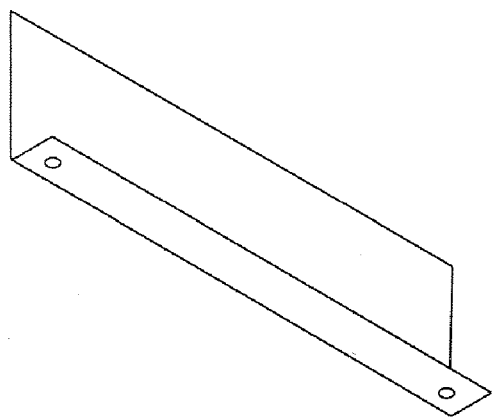
FIGS. 11a and 11b show respectively the Type 1 and Type 2 internals used in the experiments.
Figure 11B:
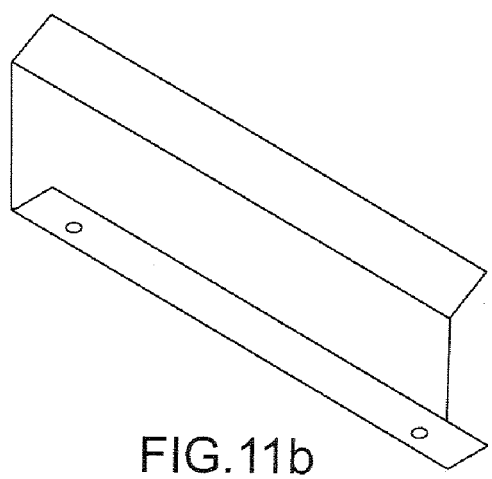

The types of internal mixing devices used are depicted in FIG. 11, with type 1 (11*a*) being a "L" shaped metal piece and type 2 (11*b*) being a piece with a 60° bend at the top. The mixing devices were mounted in such a manner that the equivalent length and actual length were equal, otherwise parallel to the axis of rotation. The mixing devices were each 100 mm in length and 30 mm high for the type 1 and 35.43 mm high for the type 2. At the four 100 mm length axial sections at the end of the reactor (i.e. the end sections at the exit of the chips), four mixing devices were mounted in the reactor, one for each 100 mm section, 90° apart. More in detail: a mixing device was mounted in the first of the 100 mm sections; a further mixing device was mounted in the second and successive 100 mm section, 90° apart from the end of the mixing device mounted in the first section; a further mixing device was mounted in the third and successive section, 90° apart from the end of the mixing device mounted in the second section and 180° apart from the end of the mixing device mounted in the first section; a further mixing device was mounted in the fourth and successive section, 90° apart from the end of the mixing device mounted in the third section, 180° apart from the end of the mixing device mounted in the second section and 270° apart from the end of the mixing device mounted in the first section. Experiments were conducted using chips of commercial bottle grade PET, as well as chips covered of magnetic powder (i.e. ferrite powder) to be injected as tracer, in order to determine the distribution curve of the residence times at the steady state. Samples were taken at the exit of the reactor, beginning when the tracer was injected and until the end of the exit of the chips with tracer, and the concentration of the chips with tracer or covered by magnetic iron was determined on the samples taken. The number n of the cascade (or series) of the n-CSTR's which might be assimilated to the experimentally obtained residence time distribution was determined on the basis of the concentration curve of the chips with tracer vs. time and the degree of plug flow was determined accordingly. The results for the examples are in Table I.

TABLE I

| Rotational Speed (r.p.m.) | Internal Type | Bed Height of pellets (mm) | Degree of Plug Flow (n) |
| --- | --- | --- | --- |
| 0.9 | None | 60 | 60 |
| 0.9 | None | 60 | 67 |
| 0.9 | 1 | 60 | 116 |
| 0.9 | 2 | 60 | 90 |
| 0.9 | 1 | 40 | 60 |
| 0.6 | None | 60 | 103 |
| 0.6 | 1 | 60 | 125 |
| 0.6 | 2 | 60 | 75 |

When mixing devices whose equivalent lengths were greater than about $1/10^{th}$ the total reactor length were mounted in the reactor, some of the lifted chips (or granules), quickly traveled, slipping forwards remaining directly in the plane of the mixing device itself, upward in the axial direction (with respect to HCIRR reactor axis of rotation), thus giving a detrimental effect on plug flow degree.

On the contrary, when mixing devices whose lengths were less than about $1/20$ the total reactor length were mounted inside the reactor, the chips (or granules) were lifted by the mixing device and fell down somewhere in the middle of the chord of sliding (or of rolling), therefore having 50% of the surface sliding path and also 50% of the rough surface motion disturbance that causes axial dispersion.

We claim:

1. Use of an inclined cylindrical rotating reactor comprising an axis of rotation, granules of polyester treated within the reactor, a granules of polyester flow regime, at least two mixing devices and an inert purge gas, for the solid state polymerization of the granules of polyester, wherein the granules of material treated within the reactor comprise a polyester and the reactor has a temperature in the range of about 140° C. to about 235° C. the axis of rotation is central and not parallel to the horizontal line perpendicular to the force of gravity, the granules of polyester flow regime is characterized by a Froude Number $Fr=(\omega^2 \times R/g)$
comprised in the range of $1\times10^{-4}$ to 0.5;
where $\omega$ is the angular velocity of the reactor;
R is the internal radius of the reactor and g is the gravity of acceleration =9.806 m/s;

and each of the at least two mixing devices has a height, width, and an equivalent length defined as the distance between the plane perpendicular to the axis of rotation that contains the point where the mixing device first protrudes from the reactor wall and the plane perpendicular to the axis of rotation that contains the point where the mixing device stops protruding from the wall and the equivalent length of the mixing device is selected from the group consisting of equivalent lengths less than 1/10th the length of the reactor, so as the granules of the polyester treated within the reactor pass through the reactor due to the force of gravity as well as the reactor rotation with a plug flow like behavior and the at least two mixing devices have holes to introduce the inert purge gas into the reactor said use comprising the steps of:
introducing the granules into the top of the reactor
passing the granules through the reactor while subjecting the granules to a stream
of inert purge gas below the turbulent rate.

2. Use of the reactor of claim 1, wherein there is at least one mixing device whose equivalent length is less than 1/20th the length of the horizontal reactor.

3. Use of the reactor of claim 1, wherein the at least two mixing devices are connected in a manner so that the inert purge gas can pass from the first mixing device to the second mixing device through a connector.

4. Use of the reactor of claim 1, wherein there is at least one mixing device, whose equivalent length coincides with the physical length and is less than $1/20^{th}$ the length of the reactor.

5. Use of the reactor of claim 1, wherein the axis of rotation is inclined in respect of the horizontal line perpendicular to the force of gravity of an angle comprised in the range 0.1°-12°.

6. Use of the reactor of claim 3, wherein the axis of rotation is inclined in respect of the horizontal line perpendicular to the force of gravity of an angle comprised in the range 0.1°-12°.

* * * * *